(12) United States Patent
Dabby

(10) Patent No.: US 7,292,745 B2
(45) Date of Patent: Nov. 6, 2007

(54) SYSTEM FOR AND METHOD OF MANUFACTURING OPTICAL/ELECTRONIC INTEGRATED CIRCUITS

(75) Inventor: Franklin W. Dabby, 515 Loring Ave., Beverly Hills, CA (US) 90024

(73) Assignee: Franklin W. Dabby, Beverly Hills, CA (US)

(*) Notice: Subject to any disclaimer, the term of this patent is extended or adjusted under 35 U.S.C. 154(b) by 0 days.

(21) Appl. No.: 10/757,366

(22) Filed: Jan. 13, 2004

(65) Prior Publication Data
US 2005/0152632 A1 Jul. 14, 2005

(51) Int. Cl.
G02B 6/12 (2006.01)
G02B 6/10 (2006.01)

(52) U.S. Cl. .................. 385/14; 385/129; 385/130; 385/131; 385/132

(58) Field of Classification Search .............. 385/14, 385/129–132
See application file for complete search history.

(56) References Cited

U.S. PATENT DOCUMENTS

| 6,078,707 | A * | 6/2000 | Yamamoto et al. | 385/14 |
| 2004/0076813 | A1* | 4/2004 | Han et al. | 428/312.6 |
| 2005/0147925 | A1* | 7/2005 | Harchanko et al. | 430/320 |

OTHER PUBLICATIONS

Lange et al. "High Gain Short Length Phosphate Glass Erbium-Doped Fiber Amplifier Material". OSA Optical Fiber Communications. 2001 (cited by applicant on IDS).*

Edgar A. Mendoza, et al., "Photolithography of Integrated Optic Devices in Sol-Gel Glasses,"SPIE, vol. 2228, Sol-Gel Optics III, pp. 580-588 (1994).

Kigre, Inc., "MM-2 High Gain Short Length Erbium Waveguide Glass," www.kigre.com.

Ruikum Wu, et al., "Fluorescence Lifetime and 980nm Pump Energy Transfer Dynamics in Erbium and Ytterbium Co-Doped Phosphate Laser," SPIE Paper No. 4968-1 Photonics West 2003, pp. 1-7.

P.G. Kik, et al., "Erbium Doped Optical Waveguide Amplifiers on Silicon," MRS Bulletin, 23(4), 48, Apr. 1998.

(Continued)

Primary Examiner—Frank G. Font
Assistant Examiner—Derek L. Dupuis
(74) Attorney, Agent, or Firm—Hogan & Hartson LLP

(57) ABSTRACT

An integrated electro-optic circuit includes a semiconductor substrate on which a photosensor may be imprinted that detects a predetermined optical signal wavelength. The electro-optic integrated circuit further includes an electronic integrated circuit, including the photosensor, imprinted on the semiconductor substrate. The integrated electro-optic circuit further includes a buffer layer laid on the electronic integrated circuit and a waveguide layer, including a waveguide, positioned on the buffer layer. The waveguide layer is formed of phosphate glass doped with a signal amplifying material. A cladding layer is laid on the waveguide layer. In the electro-optic circuit, the index of refraction of the waveguide layer is greater than an index of refraction of the buffer layer and greater than an index of refraction of the cladding layer.

13 Claims, 4 Drawing Sheets

Integrated Light Signal Tap (Side View)

OTHER PUBLICATIONS

W. Huang, et al., "Fiber-Device-Fiber Gain From a Sol-Gel Erbium-Doped Waveguide Amplifier," IEEE Photonics Technology Letters, vol. 14, No. 17, Jul. 2002, pp. 959-961.

Michael R. Lange, et al., "High Gain Short Length Phosphate Glass Erbium-Doped Fiber Amplifier Material," Presented at OSA Optical Fiber Communications (OFC) 2001, pp. 1-8.

Kigre, Inc., "MM-2 High Gain Short Length Erbium Waveguide Glass," www.kigre.com, no date.

Ruikum Wu, et al., "Fluorescence Lifetime and 980nm Pump Energy Transfer Dynamics in Erbium and Ytterbium Co-Doped Phosphate Laser," SPIE Paper No. 4968-1 Photonics West 2003, pp. 1-7, no date.

Michael R. Lange, et al., "High Gain Short Length Phosphate Glass Erbium-Doped Fiber Amplifier Material," Presented at OSA Optical Fiber Communications (OFC) 2001, pp. 1-8, no date.

* cited by examiner

Integrated Light Signal Tap (Side View)

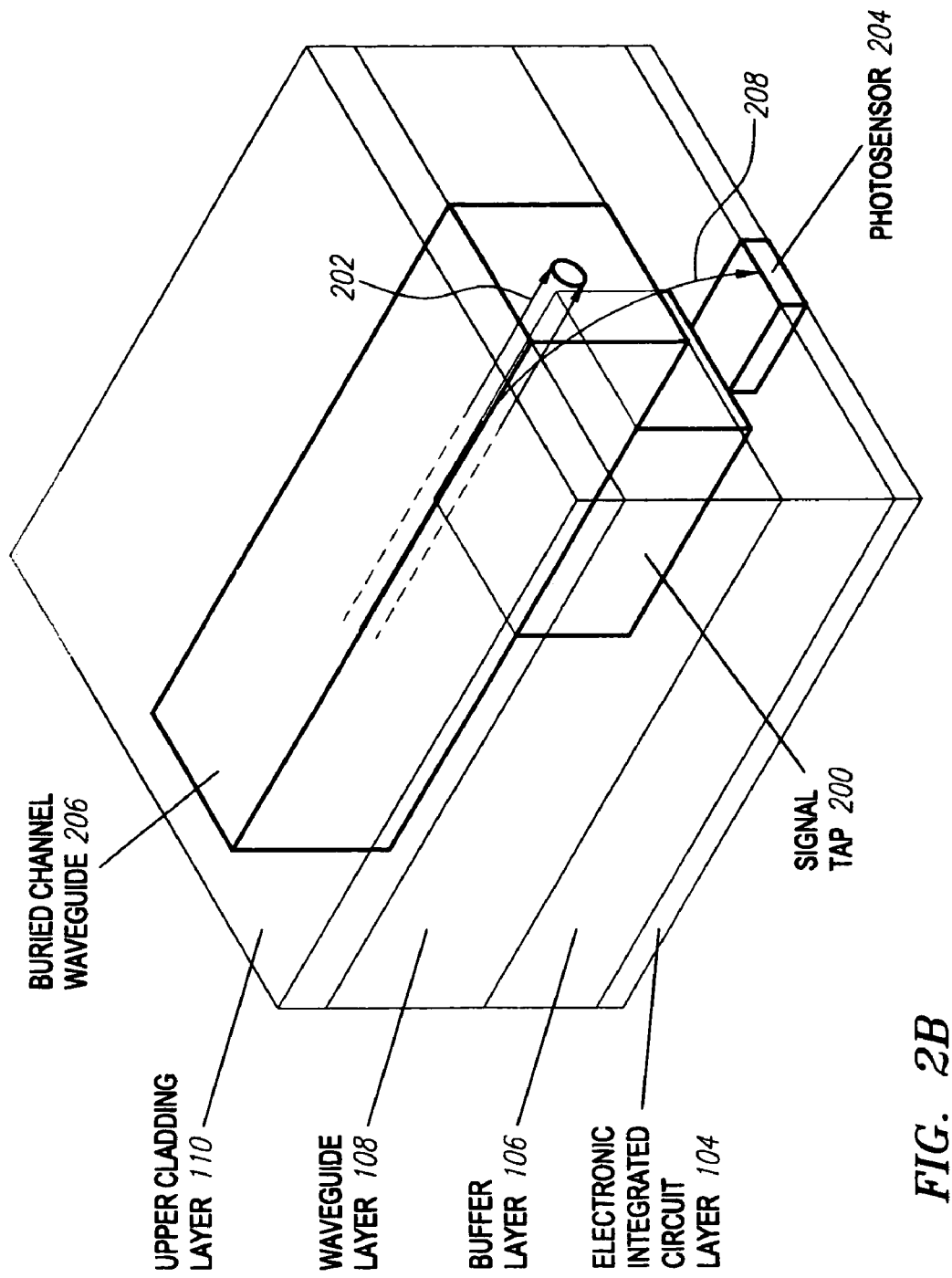
FIG. 2B  Integrated Light Signal Tap (Perspective View)

Method of Making an Integrated Electro-Optic Circuit

SYSTEM FOR AND METHOD OF MANUFACTURING OPTICAL/ELECTRONIC INTEGRATED CIRCUITS

BACKGROUND OF THE INVENTION

The field of the present invention relates to integrated circuits. More particularly, the field of the present invention relates to systems and methods for integrating electronic and optical circuits as a single integrated circuit.

Many telecommunications experts recognize that while present bandwidth needs are being met, satisfaction of those needs is not likely to continue indefinitely, without an advance in telecommunications technology. The typical consumer demands increasingly dense information content, and soon, perhaps even within the next few years, nothing short of fully interactive video, high-quality video on demand, and instant access to vast information resources, to name but a few types of high-bandwidth content, will be acceptable. Experts further recognize that a bandwidth bottleneck is likely to occur at the interface between the medium used for the backbone of global communications, i.e., fiber optics, and the media employed to complete the commonly termed "last mile" of communication, i.e., electronics-controlled wired and wireless-based systems, which connect the fiber-optic backbone to end-users such as businesses and households.

At this interface, the existing systems that manipulate (e.g., multiplex, demultiplex, transmit, receive, modulate, demodulate, and transduce components of) optical signals are far from seamless. These systems are costly, inflexible, bulky, employ many discrete components, are not as reliable as many would like, and most importantly, are unlikely to be able to meet the future bandwidth requirements.

One approach to improving these systems has been to develop optical amplifiers for use in different kinds of "optical integrated circuits." Such optical amplifiers would be integrated with other passive optical devices, such as planar waveguides, splitters and multiplexers to form such optical integrated circuits. However, the development of optical amplifiers suitable for optical integrated circuits has been a significant technological hurdle.

For example, amplifying light in silica doped with an amplifying material, the most common medium for waveguide cores, is inherently limited to a gain of about 1 db per meter, which is insufficiently low for the small form factors necessary for an integrated optical circuit. The low available gain with pure fused silica is due to the low solubility of light amplifying materials, such as erbium and ytterbium, which could be doped into the silica. The light amplifying materials have optical transitions that enable signals at particular wavelengths to be amplified. Erbium, for example, has an optical transition that can be used successfully to amplify optical signals with wavelengths around 1550 nm. Using, for example, a 980 nm diode laser as a signal pump, a 1550 nm signal traveling through an erbium-doped waveguide induces stimulated emission resulting in signal amplification. Light amplifying materials such as erbium are critical to design of any optical amplifier in an optical integrated circuit. The inability to significantly incorporate such materials into silica makes it impractical as a waveguide medium for integrated optical circuits, which require especially high signal amplification due to their very short propagation lengths.

An effective alternative to silica has been found, however, in phosphate-based glasses. Phosphate-based glasses allow the incorporation of much more of the light amplifying materials than is possible in silica-based glasses. For example, "High Ultra-Short Length Phosphate Glass Erbium-Doped Fiber Amplifier Material," by Lange et al., discloses the use of an erbium-doped phosphorous-based glass to amplify a signal in optical fiber over very short lengths. The article quotes a gain of 10 db in a 2.2 cm length of optical fiber. Such a gain is orders of magnitude greater than those possible in pure fused silica based glasses.

The higher available gain using phosphate-based glasses allows for the design of much smaller devices. For example, a 1×32 splitter can be manufactured in which each one of the 32 output channels to has the same power as the input signal in a length of a few centimeters. The same output per channel could be achieved in silica but the required length would be greater than 12 meters.

In addition to the benefit of higher available gain, phosphate-based glasses also combine such useful properties as lower processing temperature than silica based glasses, chemical durability, ion exchangeability, low upconversion losses and low concentration quenching. Phosphate based glasses suffer from relatively high signal attenuation, but in small-scale integrated optics devices powered by a pump laser, when the glass is combined with an light-amplifying material, such a limitation is not prohibitive.

Awareness of the utility of phosphate-based glass recently led to the demonstration of a practical waveguide amplifier suitable for the small form factors of an optical integrated circuit. In "Fiber-Device-Fiber Gain from a Sol-Gel Erbium-Doped Waveguide Amplifier," Huang, et al. describe the preparation of a waveguide amplifier having a sol-gel core formed from aluminophosphosilicate glass doped with erbium and ytterbium. The article further discloses that the phosphate-based core requires a lower temperature for processing (i.e., rapid thermal annealing) than a pure silica-based glass.

The minimum required processing temperature for a waveguide becomes an issue if the processing of the waveguide core is in the presence of a substrate with an imprinted integrated circuit, which generally has a tolerance up to about 400° C. Epitaxial layers of gallium indium aluminum arsenide grown on gallium aluminum arsenide and other semiconductor materials (e.g., germanium, silicon) are desirable as substrates to foster integration of the optical elements with electronic elements on the same semiconductor. Pure fused silica-based glasses, however, generally have a minimum processing temperature of around 1200° C., making such glasses difficult to process while maintaining the integrity of the electronic integrated circuit. Phosphate-based glasses, on the other hand, can be processed at temperatures below 500° C., enabling such glasses to be processed on an electronic integrated circuit-imprinted semiconductor substrate.

Developments in integrated optics have made optical integrated circuits a reality. Methods for further integrating optics with electronics, however, have not been practically addressed.

SUMMARY OF THE INVENTION

The present invention provides, in one aspect, systems for and methods for manufacturing an integrated electro-optic circuit.

In a second separate aspect, the present invention is an integrated electro-optic circuit that includes a semiconductor substrate and an electronic circuit layer positioned on the semiconductor substrate. The integrated electro-optic circuit further includes a buffer layer positioned on the electronic circuit layer and a waveguide layer, including a planar waveguide, positioned on the buffer layer. The waveguide layer is formed of phosphate glass doped with an amplifying material, and a cladding layer positioned on the waveguide layer. In the electro-optic circuit, the index of refraction of the waveguide layer is greater than the index of refraction of the buffer layer and greater than the index of refraction of the cladding layer.

In a third separate aspect, the present invention is a method of manufacturing an integrated electro-optic circuit that includes the steps of (1) obtaining a semiconductor substrate, formed of for example, silicon, suitable for a predetermined wavelength of operation, (2) providing an integrated circuit, including an optical interfacing electrical element, on the substrate, (3) depositing a buffer on the substrate, (4) depositing a phosphorous-based glass doped with at least one amplifying material on the buffer, (5) forming a buried waveguide channel in the phosphorous-based glass, and (6) depositing a cladding on the phosphorous-based glass. According to this preferred method, the index of refraction of the phosphorous-based glass is greater than the index of refraction of the cladding and greater than the index of refraction of the buffer.

Further embodiments as well as modifications, variations and enhancements of the invention are also described herein.

BRIEF DESCRIPTION OF THE DRAWINGS

FIGS. 2A and 2B are diagrams illustrating, by way of example, a preferred embodiment of a communication interface between a waveguide layer and an electronic integrated circuit, as shown in FIG. 1, in the form of a light signal tap. FIG. 2A is a side view and FIG. 2B is a perspective view.

DETAILED DESCRIPTION OF THE PREFERRED EMBODIMENTS

Figure 1:
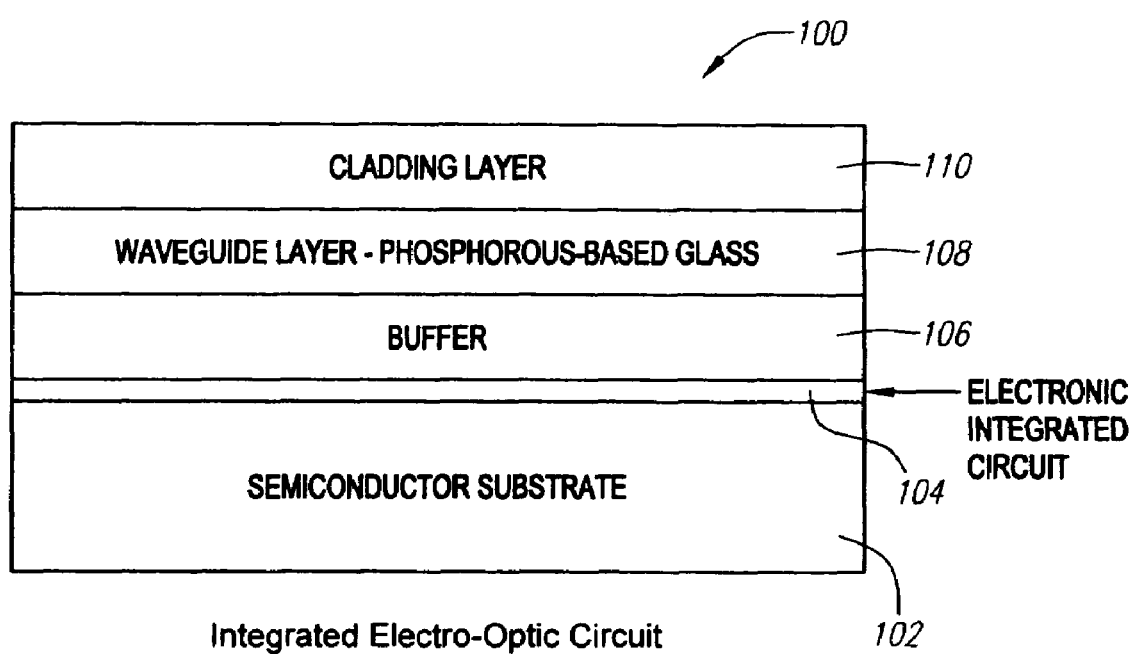
FIG. 1 is a diagram generally depicting a preferred embodiment of an integrated electro-optic circuit.

A preferred embodiment of an integrated electro-optic circuit 100 is illustrated, by way of example, in FIG. 1. Such an integrated circuit may be widely used in, for example, various communications applications including coupling the fiber-optic backbone of the Internet with the "last mile" electronic communication infrastructure. Other applications for integrated electro-optic circuits include optical communication line monitoring, optical sensing, biochemical analysis, and reliability testing. The integrated electro-optic circuit comprises several layers including, from bottom to top, a semiconductor substrate 102, an electronic integrated circuit imprinted on the semiconductor substrate 104, a buffer layer 106, a waveguide layer 108 formed of a phosphorous-based glass on the buffer 106, and a cladding layer 110 on the waveguide layer 108.

The semiconductor substrate 102 may be formed of any semiconductor material suitable for fabricating electronic integrated circuits, including silicon, germanium, a combination of the two elements (SiGe), and epitaxial layers of alloys of gallium indium aluminum arsenide grown on gallium arsenide (GaAs). The substrate 102 also is of a material from which a detector can be formed that detects the wavelength of operation for an optical signal. For example, for signal wavelengths around 1550 nm, suitable semiconductor substrate compositions include epitaxial layers of alloys of gallium indium aluminum arsenide grown on GaAs.

In one embodiment, the buffer layer 106 is formed of a silica-based glass and acts to optically and physically separate the optical waveguide layer 108 from the electronic integrated circuit 104. The buffer layer 106 has an index of refraction, $n_{buff}$, which is less than the index of refraction, $n_{core}$, of the waveguide layer. To provide the suitable separation between the waveguide layer 108 and the electronic integrated circuit 104, the buffer layer 106, in one preferred embodiment has a thickness of approximately 10 µm.

The waveguide layer 108 includes buried waveguide channels preferably formed of a phosphorous-based glass doped with an amplifying material such as erbium and/or ytterbium. The waveguide channels are buried in the sense that they are surrounded above, below and on each side by a material with a lower index of refraction than the material used to form the channel. As such, an optical signal can propagate through the waveguide channel via total internal reflection. The waveguide layer 108 therefore is preferably formed such that its index of refraction, $n_{core}$, is more than $n_{buff}$. Preferably, $n_{core}$ is between about 1.4 and about 1.5 to readily receive a signal propagating from the core of a telecommunications optical fiber with minimum reflection. Having buried waveguide channels that are comprised of a phosphorous-based glass doped with an amplifying material achieves the advantages discussed above of the higher gain and lower processing temperature than would be possible using a silica-based glass for the waveguide channels. In one preferred embodiment, the waveguide layer 108 has a thickness of approximately 8 µm.

The cladding layer 110, like the buffer layer 106, acts to optically insulate the waveguide layer 108 from above. The cladding layer 110 is preferably formed of a glass (e.g., phosphate based) with a low processing temperature (e.g., less than 500° C.) and with one of both of the following characteristics: (1) low attenuation of for wavelengths of interest or (2) capable of at least a minimum amount of amplification. The cladding layer 110 preferably has an index of refraction, $n_{clad}$, that is about the same as $n_{buff}$. Because the fields of the laser pump light and the signal light (i.e., evanescent field) is not entirely confined to the waveguide layer, the material for the cladding layer 110 may also be doped with an amplifying material such as erbium and/or ytterbium. The areas of the waveguide layer 108 which horizontally surround the waveguide channels formed of phosphorous preferably have the same refractive index as the cladding layer and may comprise the same material as the cladding layer. The phosphorous-based waveguide channels are therefore surrounded in every direction (i.e., buried) by cladding material having a lower index of refraction. In one preferred embodiment, the cladding layer 110, like the buffer layer 106, has a thickness of approximately 10 µm.

Figure 2A:
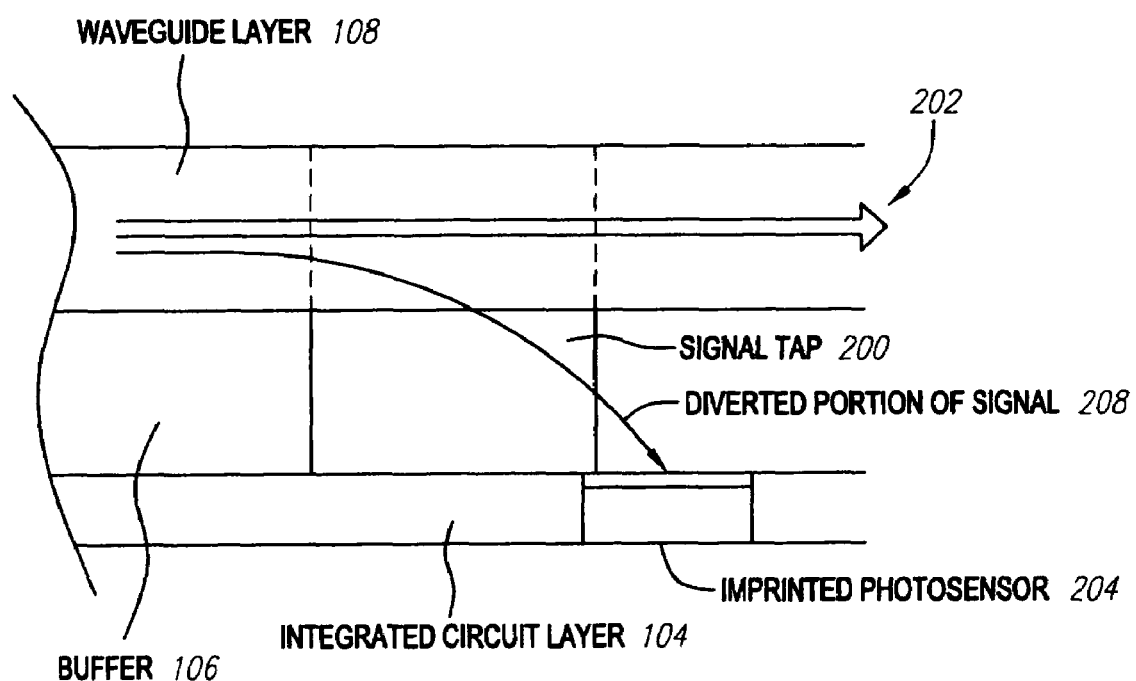

FIGS. 2A and 2B depict a preferred embodiment of a communication interface between the waveguide layer 108 and the electronic integrated circuit 104. The communication interface depicted in FIGS. 2A and 2B is in the form of an integrated light signal tap 200. In one preferred embodiment, the integrated light signal tap 200 is implemented in a region of the buffer layer 106 depicted as box-shaped in FIGS. 2A-B. The region, however, may have any convenient physical dimension that implements the functionality required by the light signal tap 200.

The function of the light signal tap 200 is to redirect a portion of an optical signal 202 that is propagating through the buried channel waveguide 206 (see FIG. 2B) in the waveguide layer 108 towards a photosensor 204 (e.g., photodiode) imprinted in the electronic integrated circuit layer 104. The light signal tap 200 and the photosensor are relatively positioned with respect to the channel waveguide 206 so that diverted optical signal is incident on the photosensor 204. The photosensor 204 is preferably designed to detect only the wavelength of optical communication signal (and thereby the diverted portion of the optical communication signal). That is, preferably, the photosensor 204 is insensitive or transparent to other wavelengths including the wavelength of the light pump, which may be, for example, operating at a wavelength of 980 nm. Once the diverted photonic signal (e.g., coupling signal or monitoring signal, etc.) is received by the photosensor 204, the photosensor 204 then sends an electronic signal to other electronic elements of the integrated circuit layer 104 for further processing.

The integrated light signal tap 200 in the buffer layer 106 may be implemented in a variety of ways. In one preferred embodiment, the light signal tap 200 is implemented wherein a predetermined segment or region of the buffer layer 106 has an increased index of refraction, $n_{buff-seg} > n_{core}$, relative to the rest of the buffer layer such that also $n_{buff} < n_{buff-seg}$. By suitable relative positioning of the light signal tap 200 and the photosensor 204, a predetermined portion of an optical signal propagating through the optical waveguide channel 206 is incident on the photosensor 204 and may be detected.

One alternative to the above implementation of the integrated light signal tap 200 is to form a periodic grating in a segment of the buffer layer 106. According to this implementation, the segment or region of the buffer layer 106 includes periodic changes in index of refraction along the path of the propagating optical signal, so as to divert a portion of an optical signal towards the photosensor 204 in the electronic integrated circuit layer 104.

Other alternatives to implementing the integrated light signal tap 200 include forming the region of the buffer layer 106 from a photovoltaic or thermo-optic material. An activating element (e.g., resistor, battery), that either generates heat or an electric potential as appropriate, is then preferably positioned below the region on the electronic integrated circuit layer 104.

To communicate information regarding the existence of an optical communication signal in the optical waveguide layer 108 to the electronic integrated circuit layer 104, the activating element is enabled. At that time, if an optical signal is propagating through the waveguide layer 108, a coupling signal (in the form of a portion of the optical signal) is generated that propagates to and is then incident on the photosensor 204. The photosensor 204 then electrically communicates the existence of the optical signal to other elements of the electronic integrated circuit 104. In this embodiment, the optical signal tap can be on or off.

These same active elements and/or other similar active elements are preferably used to communicate information from the integrated electronics layer to the optical layers. That is, by switching the active elements while an optical signal is propagating through the waveguide layer, information can be encoded into the optical signal.

As yet another alternative, the light signal tap may be implemented in the waveguide layer 108 (instead of the buffer layer 106). In one embodiment, for example, a periodic structure is provided in the waveguide layer to cause the signal to propagate out of the waveguide.

Figure 3:
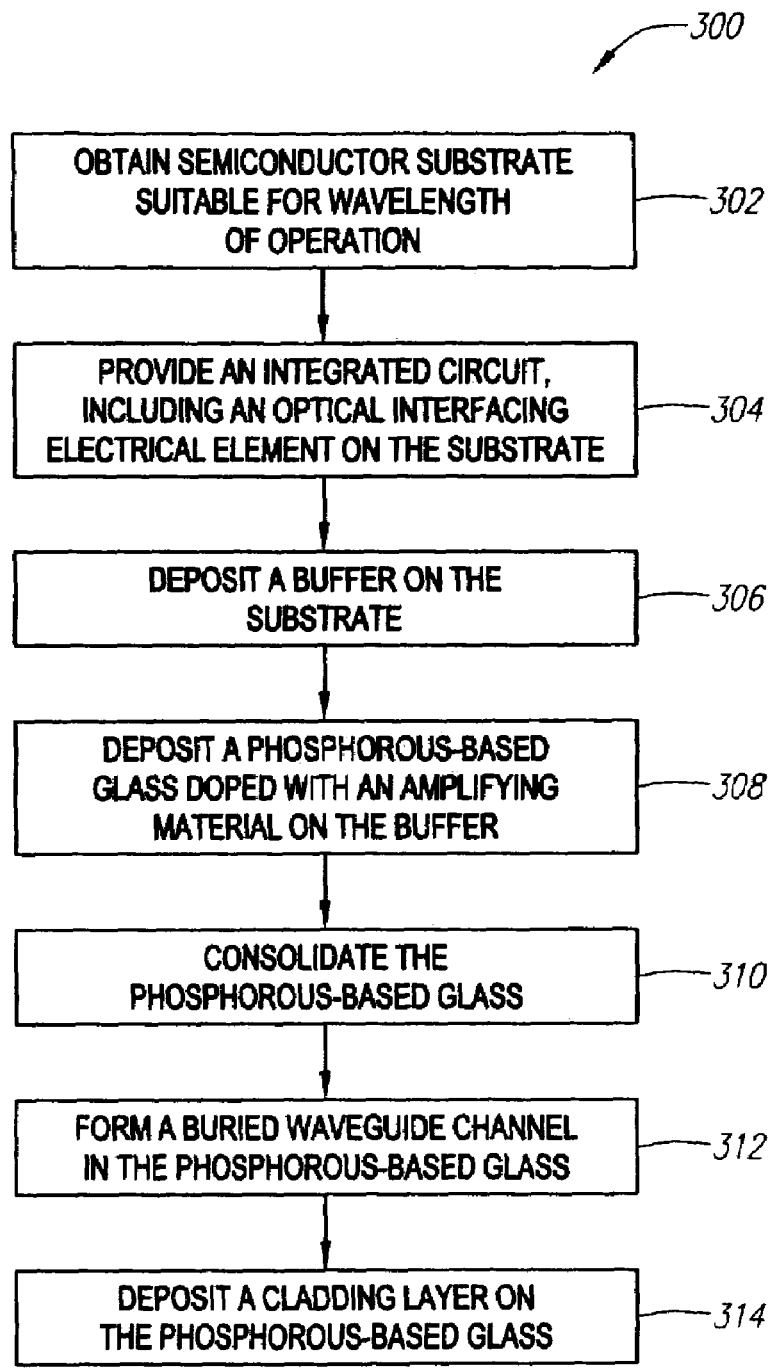
FIG. 3 depicts a diagram depicting a preferred embodiment for manufacturing the integrated electro-optic circuit described in FIGS. 1 and 2.

FIG. 3 is a diagram depicting a preferred embodiment of a method 300 for fabricating an integrated electro-optic circuit such as that described in FIGS. 1 and 2A-B. As a first step 302, a semiconductor substrate suitable for the wavelength of operation is obtained. For example, for communication within the about 1100 nm to about 1600 nm range, the semiconductor substrate is comprised of epitaxial layers of alloys of gallium indium aluminum arsenide grown on a gallium aluminum arsenide platform. When this substrate is used, miniaturized lasers may be fabricated and integrated in the substrate, further increasing the level of integration the optical/electronic circuit. If the wavelength of operation is below about 1100 nm, then a silicon substrate may be obtained. If the wavelength of operation is above 2000 nm, a germanium substrate is preferably used. Preferably, the substrate is in the form of a wafer on which many imprints of an integrated circuit may be made.

Preferably, as a next step 304, an electronic integrated circuit is imprinted on the semiconductor substrate. As discussed above, the integrated circuit is generally provided by having the integrated circuit imprinted many times on the same semiconductor wafer such as is the common practice in a semiconductor foundry and is well known to those skilled in the art of manufacturing conventional integrated circuits.

With respect to the form of the integrated circuit that is imprinted, at least one element of the electronic integrated circuit is an optical interfacing element such as the photosensor 204 discussed herein. Such an interfacing element provides a mechanism for communicating information to the electronic integrated circuit from the optical channels buried in layers to be deposited later.

In a next step 306, a buffer, composed preferably of a low optical attenuation material that amplifies light when optically pumped and/or has low attenuation, is deposited on the integrated circuit layer. The deposition process for the buffer may be performed using any one of several conventional methods including chemical vapor deposition (CVD), plasma enhanced chemical vapor deposition (PECVD), and a sol-gel process. As discussed herein, the buffer is preferably formed of a glass that comprises materials as are known in the art that have a lower refractive index relative to the waveguide layer that is deposited in a subsequent step. The buffer may be deposited by spinning a Sol-based gel on the electronic integrated circuit wafer.

Then, as a next step, the buffer layer is consolidated, for example, by heating the wafer in a conventional furnace at a temperature that does not compromise the integrated circuits on the substrate.

In a next step 308, a phosphorous-based glass doped with an amplifying material is deposited on the buffer. Application of the phosphorous-based glass may be performed using any one of the methods used to apply the buffer layer, including CVD, PECVD and sol-gel-based methods. In one preferred embodiment, the doped phosphorous-based glass is phosphorous oxide doped with erbium and/or ytterbium. The article, "Erbium doped optical Waveguide Amplifiers on Silicon," by P. G. Kik and A. Polman, MRS Bulletin 23(4), 48, April 1998, which is hereby incorporated by reference as though fully set forth herein, discloses suitable doping concentrations for erbium and/or ytterbium in phosphate based glasses.

In a next step 310, for certain methods of deposition used in step 308 (e.g., sol-gel, certain CVD methods), the phosphorous-based glass is consolidated. Preferably, the phosphorous-based glass is consolidated by heating the wafer with the phosphorous-based glass at a temperature preferably less than 500° C. The phosphate glass may be surface-heated and/or rapidly heated such that the integrated circuit layer is effectively never exposed to a temperature greater than 400° C. If silica were used instead of phosphorous, consolidation would not occur unless a consolidation temperature of at least 1000° C. is provided. Such a temperature, however, cannot be sustained by the electronic integrated circuit.

In a next step 312, buried channels are formed in the phosphorous-based glass in a pattern corresponding to the intended optical device, whether it be a waveguide, splitter, multiplexer or other optical device. Formation of the waveguide channels may be performed using any of a variety of methods known to those skilled in the art. Such methods include, for example, chemically etching the phosphorous-based glass, or applying an ultraviolet (UV) light sensitizer to the phosphorous based glass and exposing to UV radiation a pattern corresponding to the areas to have a high refractive index. For example, the phosphorous-based glass may be applied using sol-gels containing phosphorous, light amplifying materials and a UV sensitizer and spinning them on to the semiconductor wafer. If a UV light sensitizing material is also dissolved into the sol-gel, optical waveguide patterns could be readily formed by exposing the sol-gel to UV light. A procedure for forming waveguide patterns employing photolithography is disclosed in "Photolithography of Integrated Optic Devices in Sol-Gel Glasses," by E. A. Mendoza and D. J. Ferrell, SPIE Vol. 2228 Sol Gel Optic III, pp. 580-588 (1994), which is hereby incorporated by reference as though fully set forth herein.

In a next step 314, a cladding layer is deposited on the phosphorous-based glass. As with the application the buffer and waveguide layers, the cladding layer may be deposited using any one of the methods known in the art. The application of the cladding layer also serves to fill the areas of the waveguide layer that were etched in the previous step 312, consequently creating the buried channel waveguides.

While preferred embodiments of the invention have been described herein, and are further explained in the accompanying materials, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. An integrated electro-optic circuit comprising:
    a semiconductor substrate composed of a material suitable for use as a detector of a predetermined signal wavelength;
    an electronic circuit layer positioned on the semiconductor substrate;
    a buffer layer positioned on the electronic circuit layer;
    a waveguide layer, including a waveguide, positioned on the buffer layer, the waveguide layer being formed of phosphate glass doped with an amplifying material; and
    a cladding layer positioned on the waveguide layer,
    wherein the cladding layer is doped with an amplifying material,
    wherein an index of refraction of the waveguide layer is greater than an index of refraction of the buffer layer and greater than an index of refraction of the cladding layer.

2. The electro-optic circuit of claim 1, wherein the electronic circuit layer includes an electro-optic element for receiving a signal from the waveguide layer.

3. The electro-optic circuit of claim 2, wherein the electro-optic element is an optical sensor for detecting a coupling signal comprising a portion of a photonic communication signal propagating in the waveguide layer.

4. The electro-optic circuit of claim 3, further comprising a light signal tap for directing the coupling signal towards the sensor.

5. The electro-optic circuit of claim 4, wherein the light signal tap includes a region of the buffer layer having an increased index of refraction with respect to the index of refraction of the buffer layer, such that a predetermined portion of the photonic communication signal forms the coupling signal.

6. The electro-optic circuit of claim 4, wherein the light signal tap is provided in a region of the buffer layer.

7. The electro-optic circuit of claim 4, wherein the light signal tap directs the coupling signal through the buffer layer.

8. The electro-optic circuit of claim 3, wherein the amplifying material comprises erbium.

9. The electro-optic circuit of claim 8, wherein the amplifying material further comprises ytterbium.

10. The electro-optic circuit of claim 1, wherein the material comprises gallium aluminum arsenide and the predetermined signal wavelength is between about 1100 nm and about 1600 nm.

11. The electro-optic circuit of claim 1, wherein the material comprises silicon and the predetermined signal wavelength is les than about 1100 nm.

12. The electro-optic circuit of claim 1, wherein the material comprises germanium and the predetermined signal wavelength is greater than about 2000 nm.

13. The electro-optic circuit of claim 1, further comprising: a signal pump source for propagating signals.

* * * * *

UNITED STATES PATENT AND TRADEMARK OFFICE
CERTIFICATE OF CORRECTION

PATENT NO. : 7,292,745 B2  Page 1 of 1
APPLICATION NO. : 10/757366
DATED : November 6, 2007
INVENTOR(S) : Franklin W. Dabby It is certified that error appears in the above-identified patent and that said Letters Patent is hereby corrected as shown below:

Title Page #75, change "Beverly Hills" to --(Los Angeles)--.

Title Page #73, change "Beverly Hills" to --(Los Angeles)--.

Signed and Sealed this

Eighth Day of April, 2008

JON W. DUDAS
*Director of the United States Patent and Trademark Office*